(12) United States Patent
Teja et al.

(10) Patent No.: US 11,409,738 B2
(45) Date of Patent: Aug. 9, 2022

(54) METHOD AND SYSTEM FOR QUERY FEDERATION BASED ON NATURAL LANGUAGE PROCESSING

(71) Applicant: Larsen & Toubro Infotech Ltd, Mumbai (IN)

(72) Inventors: Aida Teja, Bangalore (IN); Venkateswarlu Thiriveedhi, Bengaluru (IN); Sandeep Acharya, Chennai (IN); Pradeepta Mishra, Bangalore (IN); Ashish Rishi, Bangalore (IN); Satyakam Mohanty, Bangalore (IN)

(73) Assignee: Larsen & Toubro Infotech Ltd, Mumbai (IN)

( * ) Notice: Subject to any disclaimer, the term of this patent is extended or adjusted under 35 U.S.C. 154(b) by 0 days.

(21) Appl. No.: 17/207,362

(22) Filed: Mar. 19, 2021

(65) Prior Publication Data

US 2022/0092066 A1    Mar. 24, 2022

(51) Int. Cl.
*G06F 16/2452* (2019.01)
*G06F 16/242* (2019.01)
*G06F 16/2458* (2019.01)
*G06F 40/205* (2020.01)

(52) U.S. Cl.
CPC .... *G06F 16/24522* (2019.01); *G06F 16/2433* (2019.01); *G06F 16/2471* (2019.01); *G06F 40/205* (2020.01)

(58) Field of Classification Search
CPC .......... G06F 16/24522; G06F 16/2433; G06F 16/2471; G06F 40/205
See application file for complete search history.

(56) References Cited

U.S. PATENT DOCUMENTS

| | | | |
|---|---|---|---|
| 5,913,214 A * | 6/1999 | Madnick | G06F 16/2452 |
| 2010/0241610 A1* | 9/2010 | Gibson | G06F 16/34 706/54 |
| 2017/0262501 A1* | 9/2017 | Namboodiri | G06F 16/24534 |
| 2018/0018676 A1* | 1/2018 | Mukherjee | G06Q 30/018 |
| 2019/0065513 A1* | 2/2019 | Mashinsky | G06Q 30/0256 |
| 2019/0102390 A1* | 4/2019 | Antunes | G06F 40/295 |
| 2020/0394190 A1* | 12/2020 | Chaudhuri | G06F 16/243 |

* cited by examiner

*Primary Examiner* — Cam Y T Truong
(74) *Attorney, Agent, or Firm* — Farrell Patent Law PC; Mark Farrell

(57) ABSTRACT

A system and method for generating a database query from a natural language using a query engine selector module for identifying appropriate database query format, a query engine builder module to generate appropriate database query using an intermediate query language 2 (IQL2) as input, and a data retriever module for fetching data from single or multiple data sources.

4 Claims, 2 Drawing Sheets

METHOD AND SYSTEM FOR QUERY FEDERATION BASED ON NATURAL LANGUAGE PROCESSING

TECHNICAL FIELD OF THE INVENTION

The present invention generally relates to the domain of natural language processing, and more particularly to a system and method for converting natural language queries entered by a user into a database specific queries to extract data from one or more data sources.

BACKGROUND

In recent times, business intelligence has become a staple in many organizations worldwide. The term "data-driven company" is ubiquitous across all types of businesses, from startups to Fortune 500 companies. With the introduction of cloud-based data warehouse services (e.g., Redshift, Google Big Query, EMR, Hadoop on Cloud, etc.) in recent years, the efficiency and speed at which scalable business analytical solutions are processed has increased. However, there still exists a need for an accessible and easy-to-use business intelligence tool that facilitates the way business users can derive analytical insights from data. Traditionally, organizations employed a group of data analysts and business intelligence developers to create dashboards based on data for presentation to business users such as CFOs, CEOs, etc. These skilled professionals may become burdened by administrative work while creating dashboards reports, resulting in potential time loss for business users to gain analytical insights.

Indian patent application IN201841025668 (herein referred in entirety) discloses a natural language processing engine MIRA (Machine Intelligence for Research and Analytics), which is a Question & Answer (Q&A) system for processing business queries and generating insights. The business queries can be provided in natural language by a user, via a query interface. The generated insights and charts are presented to the user in a dashboard. MIRA helps enterprises to democratize data for business users, or people having less or no analytical or technical background.

MIRA system will require user to de-normalize the data and copy the same into a local SQL or no-SQL database. However, to copy this data from client's database to a local database will require a traditional ETL (Extract Transform Load) process. This ETL process will require a data analyst and a data modeler to analyze and create a denormalized data model basis the schema of the underlying source data. Also, it will need a data engineer to build a custom ETL script to copy data.

The problem becomes more complicated in an enterprise environment wherein data is scattered across multiple data sources provided by different business units. This type of data storage requires a separate data modeling and ETL script for each of these different data sources.

Further, US patent application 20180210883 discloses a concept of SQL query (database query) generation and data extraction process from database warehouse, wherein the SQL query is generated based on questions asked by the user in natural language. The SQL query is executed against the database warehouse to extract the required data from the database warehouse and answer in form of graphs or narration and/or voice response is generated from query output, to be provided to the user. The SQL query is generated by parsing the question asked by the user in natural language, by identifying various measures, metrics, dimensions, etc. However, US '883 does not mention the concept of generating SQL query taking IQL2 as an input (as mentioned in the present invention). Further, US '883 discloses a concept of providing visual output to the user by generating and executing a SQL query against a database warehouse, wherein the SQL query is generated by parsing question asked by the user in natural language. Moreover, it can be inferred that the output generated by executing SQL query against a database warehouse is a JSON output, however, US '883 does not explicitly mention the concept of producing and providing a JSON file, XML file or of the kind as output.

Another, US patent document 9,959,311 discloses a system and method for generating SQL query (database query) from regular English sentences. The SQL queries are based on natural language input provided by the user using natural language processing. The SQL query is sent to the database and results obtained are provided to the user. Moreover, US '311 also discloses use of ontology to relate user input with a relational and semantic database, to appropriately generate SQL query in order to retrieve data from the database. However, US '311 does not mention the concept of generating SQL query taking IQL2 as an input (as mentioned in the present invention). Further, US '311 discloses a concept of providing visual output to the user (in form of a table) by generating and executing a SQL query, wherein the SQL query is generated by the regular English sentences provided by the user as an input. Therefore, it can be inferred that the output generated by sending an SQL query to a database is a JSON output, however, US '311 does not explicitly mention the concept of producing and providing a JSON file, XML file or of the kind as output.

Based on the foregoing, a need therefore exists for an improved system for generating a query for fetching data directly from multitude of enterprise data sources, thus eliminating the need for conventional step of copying data and its corresponding overheads. Moreover, there exists a need to fetch data from different types of databases by generating different database queries.

DETAILED DESCRIPTION OF THE INVENTION

The present invention discloses a system and method for generating database query from a natural language using a query engine selector module for identifying appropriate database query format, a query engine builder module to generate appropriate database query using an intermediate query language 2 (IQL2) as input, and a data retriever module for fetching data from single or multiple data sources.

In one aspect of the disclosure, a method for query federation based on natural language. The method comprises receiving a natural language query from a user, converting the natural language query into an intermediate query language 2 (IQL2), parsing the generated IQL2 to identify one or more database query format based on a type of one or more data source using a selector component of a query engine selector module and generating one or more database query using a composer component of a query engine builder module.

In another aspect of the disclosure, a method of data retrieval using one or more generated database query. The method comprises retrieving data from one or more data sources using a data retriever module, wherein the data retriever module further comprises a query executor component and data transformation component.

In another aspect of the disclosure, a system for query federation based on natural language. The system comprises a user interface to receive a natural language query from a user, an intermediate query generator module to convert the natural language query into an intermediate query language 2 (IQL2), a parser to analyze, extract, and structure data from the generated IQL2, a query engine selector module comprising a selector component to identify one or more database query format based on a type of one or more data source and a query engine builder module comprising a composer component to generate one or more database query.

In another aspect of the disclosure, a system for data retrieval using one or more generated database query, the system comprises a data retriever module for retrieving data from one or more data sources, wherein the data retriever module further comprises a query executor component and data transformation component.

Figure 1:
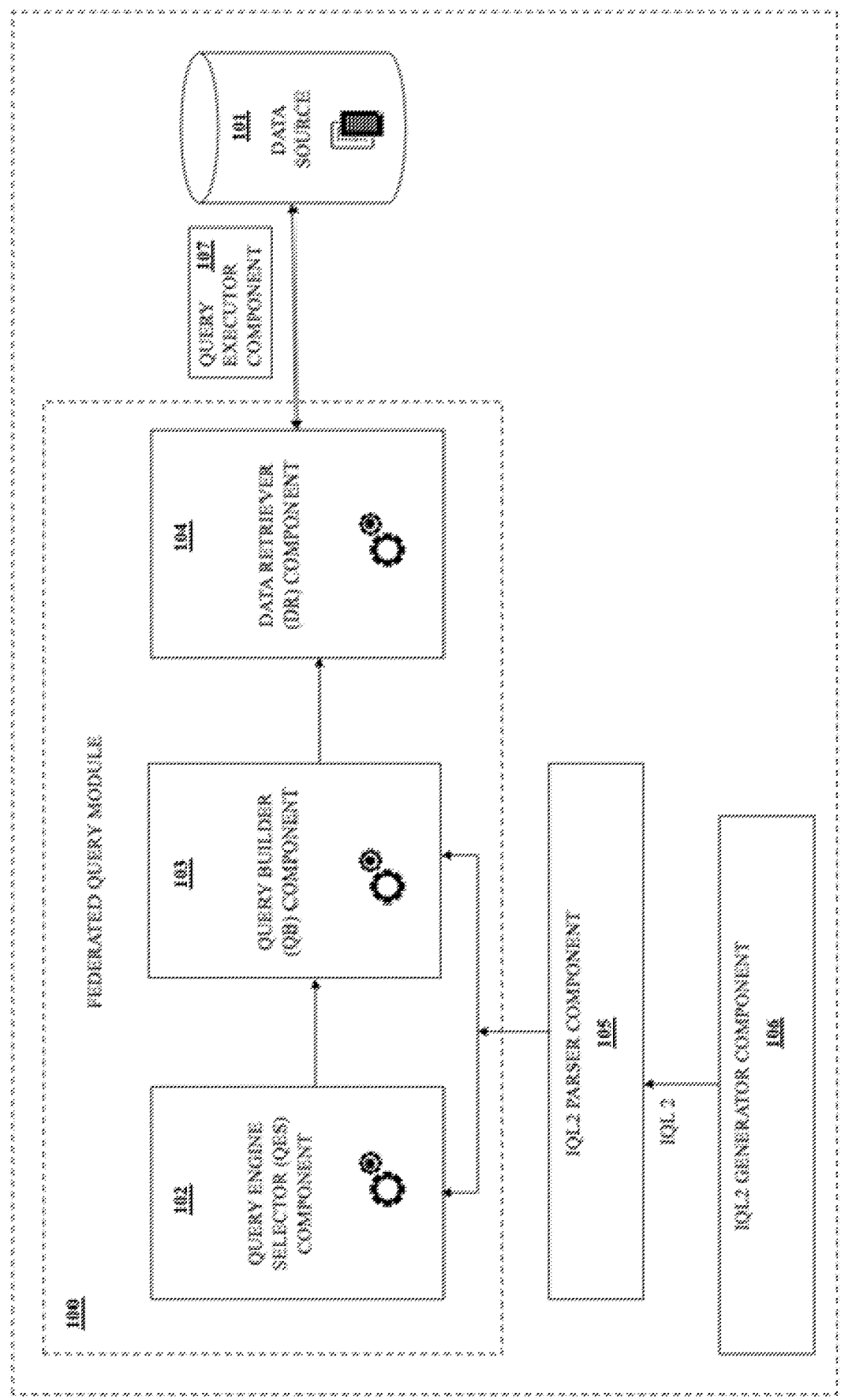
FIG. 1 provides detailed view of a system for federated query module.

FIG. 1 provides detailed view of a system for federated query module 100. Intermediate query language 2 (IQL2) is provided as an input to the federated query module 100, wherein the IQL2 is generated by IQL2 generator component 106. The IQL2 is parsed using an IQL2 parser component 105 to generate IQL2 object model. The IQL2 object model is further processed by the federated query module. The federated query module comprises of three components a Query engine selector component 102, a query builder component 103 and a data retriever component 104.

In another embodiment of the invention, the object model generated by parsing IQL2 and provided to the federated query module 100 is different to object model generated in IN201841025668 (hereinafter referred as MIRA 1.0), as it has following additional details as compared to IQL2 generated in MIRA 1.0:

Type of data source as Oracle, MS SQL, My SQL, PostgreSQL, MongoDB, Elasticsearch, Redshift, Snowflake etc. for each query;

For data from multiple sources where join operation is supported, a single query join based query will be generated and the fields involved in each of these join operations will be added to output;

For data from multiple sources or from data sources where join operations is not supported, the output will be extended with an array of query elements generated for each source details of operations that needs to be performed like union etc.

To differentiate duplicate column names across tables, data sources with all column names will be represented in their fully qualified form for example data_source_name.table_name.column_name.

An embodiment of the present invention discloses steps performed by IQL2 parser component 105 as follows:

validate IQL2 basis IQL2's schema definition (similar to XML schema validation)

check if mandatory elements are all available check for the columns, data types mentioned in IQL2 against the actual data catalog, wherein the data catalog comprises metadata of database object definitions like tables, views, indexes and their synonyms, annotations. It further contains schema information of a table, view like the column name, data type and the columns referred in an index. It periodically synchronizes with underlying database to collect this information.

store IQL2 in an object form

Further, the IQL2 parser component provides a user interface and an application program interface-based mechanism to discover this information either by analysts, data scientists or developers.

The Query Engine Selector (QES) 102 component is used to select appropriate query engine framework for processing IQL2. It uses the IQL2 parser component 105 to identify one or more data sources and select an appropriate query engine(s) to process IQL2.

An embodiment of the present invention discloses steps performed by Query engine selector component 102 as follows:

Takes output of IQL2 parser component to identify the target data source to connect with, Checks from the list of available QEs which supports this data source.

The outcome will be one of the following:

Single QE—In this case use the same QE

Multiple QEs available—In this case we need to identify one QE basis the QE selection criteria defined upfront:

by requests—QE with lower requests will be selected;

by_avg_resp_time—avg. response time of last N queries;

by_query_type—QE supporting the query type (simple, nested, join, switch case) will be selected;

by_weightage—on a scale of 0 to 10. 0 being lower weightage and 10 being the weightage. QE with higher weightage will be selected;

by_supporting_feature—cache, cube, real-time sync, batch sync etc.

by_cluster_size—no. of instances this QE is running on. QE with larger cluster size will be used.

No QE available—In this case we need to check whether there is any native JDBC, ODBC connector available or a REST API based connector available for the target database.

Once the QE or QEs are selected, QES component further pings the QE server to check its availability. If not available, repeats the above steps for a new QE selection. Stop, if there is no matching QE available.

Add the QE or native connector along with its meta information to the QE selection list.

If there is no supporting QE or connector available, return a status message "No QE or Connector available for this data source".

Repeat the above steps for each query element in IQL2.

Return the list of QEs/Native connectors selected.

Apart from this a QES module will have options to add/edit/delete a Query Engine add/edit/delete a Native Connector It can take parameters like IP Address, Port where the new QE is setup and connection mechanism, the SQL Dialect which it supports.

It can further take input of list of data sources which this QE supports.

Also, it takes input of other meta information (like query type, weightage, features, cluster size etc. which will be essential for Query Engine Selection.

The Query Builder (QB) component 103 is used to take IQL2 as input and generate an appropriate database specific query as an output. The database specific query can be an SQL query type 1, SQL query type 2, No-SQL elastic search query or like. The Query Builder (QB) component 103 uses the IQL2 parser component 105 to identify elements required for query construction i.e., dimensions, measures, filters, actions and grouping. The QB component also generates directed acyclic graph (DAG) comprising of multiple tasks organized in a way that reflects their relationships and dependencies. Each task is either a database query or an operation. The query can be an SQL query type 1, SQL query type 2, No-SQL Elasticsearch query or like. The Query builder component 103 comprises a composer component.

The database query is constructed basis the query elements identified in IQL2 i.e. dimensions, measures, filters, actions, grouping etc.

The operations task could be a data transformation as defined below and is not limited to these operations:
QueryOperation—executes a query
JoinOperation—joins data from two tables
RowOperation—performs data transformation of an existing column or a new column basis criterion defined on other columns data
ColOperation—performs date, string, numeric and other transformations of a column
CustOperation—calls any user defined function An embodiment of the present invention discloses steps performed by Query builder component 103 as follows:
Takes outputs of IQL2 parser and QES components;
Checks for number of queries to be built basis the following criteria
  no. of different data sources to fetch data from
  query capability of the identified query engine or connector (like support for different types of aggregations, joins, switch case);
Checks for the type of query to be built;
Identifies the table level operations to be performed like inner join, outer join, union etc;
Identifies row level operations to be performed like (field_A>field_B then field_C=field_A else field_B);
Identifies column level operations to be performed like (MONTH(datetime_field), YEAR(date_time_field), ROUND(numeric_field), SUB_STR(string_field) etc);
Select Template basis the QE selection, type of query to be built and basis operations to be performed;
If template available for all the above selection criteria\
  Constructs query by replacing the variable elements in template with actual values from IQL2 parsed data;
Else if template available with partial selection of operations
  Construct query as above;
  Share the list of pending operations to performed post data fetch;
Identify the sequence of queries and operations to be performed and construct a DAG;
Return DAG along with the QES output's meta info;
Apart from the above a QB module will also have options to
  add/edit/delete a template basis query type and basis QE or Native Connector selection;
  add/edit/delete functions for a column level operation basis QE or Native Connector selection The Data Retriever (DR) component 104 is used to fetch data from multiple data sources. After fetching from one data source, the data retriever component 104 checks if any other data source is identified in IQL2 and fetches data from that particular source. This process continues until no other data source is left according to the IQL2. Then, the data retriever component 104 joins data by referring to join columns as identified in the IQL2 to produce an output file. The output file may be a JSON file, XML file or like.

An embodiment of the present invention discloses steps performed by Data retriever component 104 as follows:
For each query step in DAG, a Query Executor (QE) component 107 to:
  Connect to the underlying data source using a QE or a Native Connector;
  Fetch data and store it in local memory;
  A Data Transformation component to perform pending operations (at table level, row level, column level) basis operation step for this query as defined in DAG;
  Convert data into a JSON, XML, comma, tab separated text output or any other outputs as defined;
  Return converted data as output.

The data retriever component is used to fetch data and perform different transformation operations as defined in the DAG output of Query Builder component 103. The data retriever component 104 generates an output in the form of a JSON, CSV, XML or the like.

For example, if we want to fetch data from two tables and do a join operation between these two tables a DAG would look like this:
[FetchTbl1, FetchTbl2]>>JoinTbl1Tbl2
Wherein,
FetchTbl1 is a QueryOperation task to retrieve data from TBL1;
FetchTbl2 is a QueryOperation task to retrieve data from TBL2;
JoinTbl1Tbl2 is a JoinOperation to join output data from TBL1, TBL2. and FetchTbl1, FetchTbl2 tasks are executed in parallel and JoinTbl1Tbl2 task is executed post completion of these two tasks.

Figure 2:
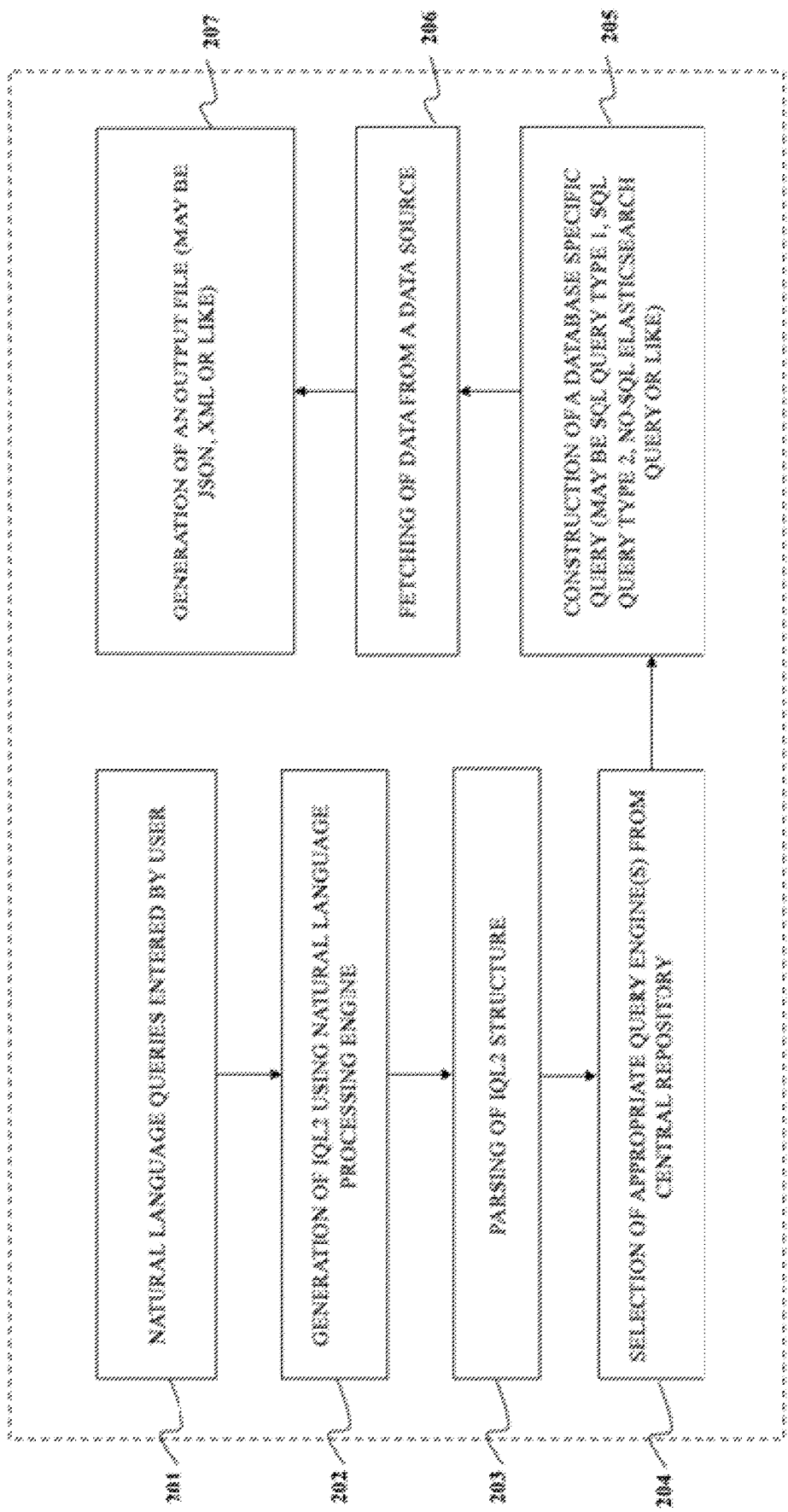
FIG. 2 provides a flowchart explaining a method for generating database query from natural language query using the federated query module.

FIG. 2 provides a flowchart explaining the method for generating database query from natural language query using the federated query module. At step 201, natural language queries are entered by the user in an interface which is used to process natural language queries and generate corresponding visualizations to generate business insights. The natural language queries are processed and converted into an intermediate query language IQL1. IQL1 gives a choice to the user to select from a range of options generated by the natural language processing engine. After the user selects an appropriate option, generation of IQL2 takes place at step 202. IQL2 is further parsed by using an IQL2 parser component at step 203. The IQL2 parser component is used to parse individual elements of IQL2 structure and generate an IQL2 object model to be further processed by the federated query module.

At step 204, the processing of IQL2 is executed by a Query Engine Selector (QES) component. The Query engine selector selects appropriate query engine framework for processing IQL2. It uses the IQL2 parser component to identify target data source(s) and select an appropriate query engine(s).

At step 205, the Query Builder (QB) component takes IQL2 as an input and generates an appropriate database specific query as an output. The database specific query can be an SQL query type 1, SQL query type 2, No-SQL elastic search query or like. The Query Builder (QB) component uses IQL2 parser component to identify elements required for query construction i.e. dimensions, measures, filters, actions and grouping.

Further at step 206, the Data Retriever (DR) component is used to fetch data from multiple data sources. After fetching from one data source, the data retriever checks if any other source is identified in IQL2 and fetches data from that particular source. This process continues until no other data source is left according to the IQL2. Then, the data retriever (DR) component joins data by referring to join columns as identified in the IQL2 to produce an output file at step 207. The output file may be a JSON file, XML file or like.

The present invention generates an Intermediate Query Language (IQL2) by processing natural language entered by a business user, to easily fetch data from a data source using a database query, wherein the database query is generated using IQL2, thereby eliminating the need for copying data and manual process of generating database query.

The IQL2 provides a universal framework for generating database query irrespective of the type of database (SQL, No-SQL, etc.).

What is claimed is:

1. A method for query federation based on natural language, the method comprising:
   receiving a natural language query from a user via a user interface of a system;
   converting, by an intermediate query generator module of the system, the natural language query into an intermediate query language;
   parsing, by a parser of the system, the intermediate query language to extract structure data from the intermediate query language;
   identifying, by a selector module of the system, one or more database query formats based on the parsed intermediate query language and one or more types of the structured data;
   selecting, by a query engine selector module of the system, one or more appropriate query engine frameworks for processing the parsed intermediate query language to generate database query elements based on a type of each target data source of target data sources, wherein the type of said each target data source of target data sources includes a Structured Query Language (SQL) data source or a non-SQL data source, wherein the one or more database query formats are identified based on the type of said each target data source of target data sources, wherein the one or more database query formats includes a first SQL query type, a second SQL query type, and a No-SQL elastic search query;
   determining, by the system, one or more target data sources for each database query element of the database query elements in the parsed intermediate query language, wherein the database query elements include dimensions, measures, filters, actions and grouping;
   adding query engine selectors along with meta information of the query engine selectors to a selection list;
   for each database query element of the database query elements:
      determining whether a query engine selector, from the selection list, is available for the one or more target data sources; and
      returning a status message when the query engine selector is not available for the one or more target data source;
   pinging, by the system, a query engine of query engines to determine an availability of the query engine, wherein the determining the availability of the query engine is based on the determining whether the query engine selector is available for the one or more target data sources;
   selecting, by the system, based the availability of the query engine for processing said each database query element of the database query elements with each respective one or more target data sources;
   determining, by the system, an Internet Protocol (IP) address and port for each respective connection mechanism to the selected query engine for each respective one or more target data sources;
   for said each database query element of the database query elements, accessing, by using the selected query engine of the query engines, each target data source of one or more target data sources to retrieve data via said each respective connection mechanism of connection mechanisms at the IP address and port;
   converting, by the system, the retrieved data into an output file comprising a JSON file or Extensible Markup Language (XML) file; and
   outputting, by the system, the output file to the user via the user interface.

2. The method of claim 1, further comprising: fetching data from each respective target data source using each respective connection mechanism; storing the data in a memory.

3. A system for query federation based on natural language, the system comprising:
   one or more query engine servers; a memory;
   a user interface to receive a natural language query from a user;
   an Intermediate Query Language I generator to convert the natural language query into an intermediate query language;
   a parser to parse the intermediate query language for extracting structure data from the intermediate query language;
   modules to:
   identify one or more database query formats based on the parsed intermediate query language and one or more types of the structured data;
   select one or more appropriate query engine frameworks for processing the parsed intermediate query language to generate database query elements based on a type of each target data source of target data sources, wherein the type of said each target data source of target data sources includes a Structured Query Language (SQL) data source or a non-SQL data source, wherein the one or more database query formats are identified based on the type of said each target data source of the target data sources, wherein the one or more database query formats includes a first SQL query type, a second SQL query type, and a No-SQL elastic search query;
   determine one or more target data sources for each database query element of the database query elements in the parsed intermediate query language, wherein the database query elements include dimensions, measures, filters, actions and grouping;
   add query engine selectors along with meta information of the query engine selectors to a selection list;
   for each database query element of the database query elements:
      determine whether a query engine selector, from the selection list, is available for the one or more target data sources; and
      return a status message when the query engine selector is not available for the one or more target data source;
   ping a query engine of query engines to determine an availability of the query engine, wherein the determining the availability of the query engine is based on the determining whether the query engine selector is available for the one or more target data sources;

select, based the availability of the query engine, the query engine for processing said each database query element of the database query elements with each respective one or more target data sources;

determine an Internet Protocol (IP) address and port for each respective connection mechanism to the selected query engine with each respective one or more target data sources;

for said each database query element of the database query elements, access, by using the selected query engine of the query engines, each target data source of the one or more target data sources to retrieve data via said each respective connection mechanism of connection mechanisms at the IP address and port;

convert the retrieved data into an output file comprising a JSON file or an Extensible Markup Language (XML) file; and output the output file to the user via the user interface.

4. The system of claim 3, wherein the data retriever component: fetches data from each respective target data source using each respective connection mechanism; stores the data in the memory.

* * * * *